US012710558B2

(12) United States Patent
Hirabayashi

(10) Patent No.: US 12,710,558 B2
(45) Date of Patent: Aug. 18, 2026

(54) REFLECTOR TRACKING FOR WAVEFORM DATA

(71) Applicant: SCHLUMBERGER TECHNOLOGY CORPORATION, Sugar Land, TX (US)

(72) Inventor: Nobuyasu Hirabayashi, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 255 days.

(21) Appl. No.: 18/636,048

(22) Filed: Apr. 15, 2024

(65) Prior Publication Data

US 2025/0321348 A1 Oct. 16, 2025

(51) Int. Cl.
*G01V 1/50* (2006.01)
*E21B 49/00* (2006.01)

(52) U.S. Cl.
CPC ................ *G01V 1/50* (2013.01); *E21B 49/00* (2013.01); *E21B 2200/20* (2020.05); *G01V 2210/64* (2013.01)

(58) Field of Classification Search
CPC ...... G01V 1/50; G01V 2210/64; E21B 49/00; E21B 2200/20
USPC .............................................................. 702/6
See application file for complete search history.

(56) References Cited

U.S. PATENT DOCUMENTS

| | | | | |
|---|---|---|---|---|
| 4,204,279 | A * | 5/1980 | Parrack | G01V 1/366 367/63 |
| 8,213,261 | B2 | 7/2012 | Imhof et al. | |
| 8,447,524 | B2 | 5/2013 | Chen et al. | |
| 9,164,188 | B2 | 10/2015 | Bruun et al. | |
| 2014/0169127 | A1 | 6/2014 | Orban | |
| 2015/0117144 | A1 | 4/2015 | Sun | |
| 2015/0168574 | A1 | 6/2015 | Wallet et al. | |
| 2015/0355355 | A1 | 12/2015 | Guan et al. | |
| 2016/0070012 | A1* | 3/2016 | Rutten | G01V 1/301 702/16 |
| 2018/0246243 | A1 | 8/2018 | Hirabayashi | |
| 2025/0298165 | A1* | 9/2025 | Yin | G01H 9/004 |

OTHER PUBLICATIONS

Hirabayashi, N., 2021. Beamform processing for sonic imaging using monopole and dipole sources, Geophysics, 86 (1), D1-D14.

* cited by examiner

*Primary Examiner* — Michael P Nghiem
(74) *Attorney, Agent, or Firm* — Kyle R. Miiller

(57) ABSTRACT

Methods and systems for managing operation of a well are disclosed. The method may include obtaining sonic log data for a geological formation in which the well is positioned. An iterative cross-correlation based reflector tracking process may be performed using the sonic log data to obtain a reflector data package. The reflector data package may include a plurality of points on a reflector and a plurality of dip angles of the reflector for the plurality of points. The reflector data package may be used, at least in part, to operate the well.

12 Claims, 9 Drawing Sheets

REFLECTOR TRACKING FOR WAVEFORM DATA

FIELD

Embodiments disclosed herein relate generally to well operations. More particularly, embodiments disclosed herein relate to systems and methods for operating wells using acoustic well log data.

BACKGROUND

Geological formations may host a range of resources. For example, geological formations may include trapped liquids and/or gasses that may include hydrocarbons of various types. These hydrocarbons may be used for a variety of purposes.

Well logging tools may be used to probe the geological formations penetrated by a wellbore in order to obtain information regarding geological formation properties and/or properties of the wellbore itself. This information may be used to produce the hydrocarbons.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an aspect, a method for managing operation of a well is disclosed. The method may include: obtaining sonic log data for a geological formation in which the well is positioned; performing an iterative cross-correlation based reflector tracking process using the sonic log data to obtain a reflector data package, the reflector data package including a plurality of points on a reflector and a plurality of dip angles of the reflector for the plurality of points; and, using the reflector data package to operate the well.

The method may also include, prior to performing the iterative cross-correlation based reflector tracking process, obtaining a migrated image of the sonic log data, the migrated image comprising a plurality of traces.

The iterative cross-correlation based reflector tracking process may use an initial point of the plurality of points, the initial point associated with a first trace of the plurality of traces, and the initial point being identified based on an envelope of the first trace.

Performing the iterative cross-correlation based reflector tracking process may include performing a cross-correlation between the first trace and at least one proximate trace of the plurality of traces to obtain a set of cross-correlation coefficients, and obtaining a dip angle of the plurality of dip angles for the initial point using the cross-correlation coefficients.

Obtaining the dip angle may include identifying a cross-correlation coefficient of the cross-correlation coefficients that indicates a highest degree of correlation, and using a second point associated with the identified cross-correlation coefficient to identify the dip angle for the initial point.

Performing the iterative cross-correlation based reflector tracking process may further include estimating a successive point on the reflector based on the initial point and the dip angle.

A second dip angle of the plurality of dip angles for the successive point may be estimated using an estimation method that varies based on the cross-correlation coefficient and a threshold.

The method may further include: obtaining a well model for the well based, in part, on the reflector data package; and, selecting operating parameters for the well based, in part, on the well model, wherein the well is operated using the operating parameters.

The method may further still include: obtaining a geological model for the geological formation based, in part, on the reflector data package; and, obtaining an energy product based, in part, on the geological model.

In an aspect, a non-transitory machine-readable medium having instructions stored therein, which when executed by a processor, cause the processor to perform operations for managing operation of a well is disclosed. The operations may cause the method, as discussed above, to be performed.

In an aspect, a data processing system is provided. The data processing system may include a processor; and a memory coupled to the processor to store instructions, which when executed by the processor, cause the processor to perform operations for managing operation of a well. The operations may cause the method, as discussed above, to be performed.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

Exploitation of subterranean resources may allow for hydrocarbon-based fuels to be produced, gaseous hydrocarbon products to be generated, and/or for other energy products to be obtained. To exploit the subterranean resources, wells used to extract the subterranean resources may be created.

Figure 1A:
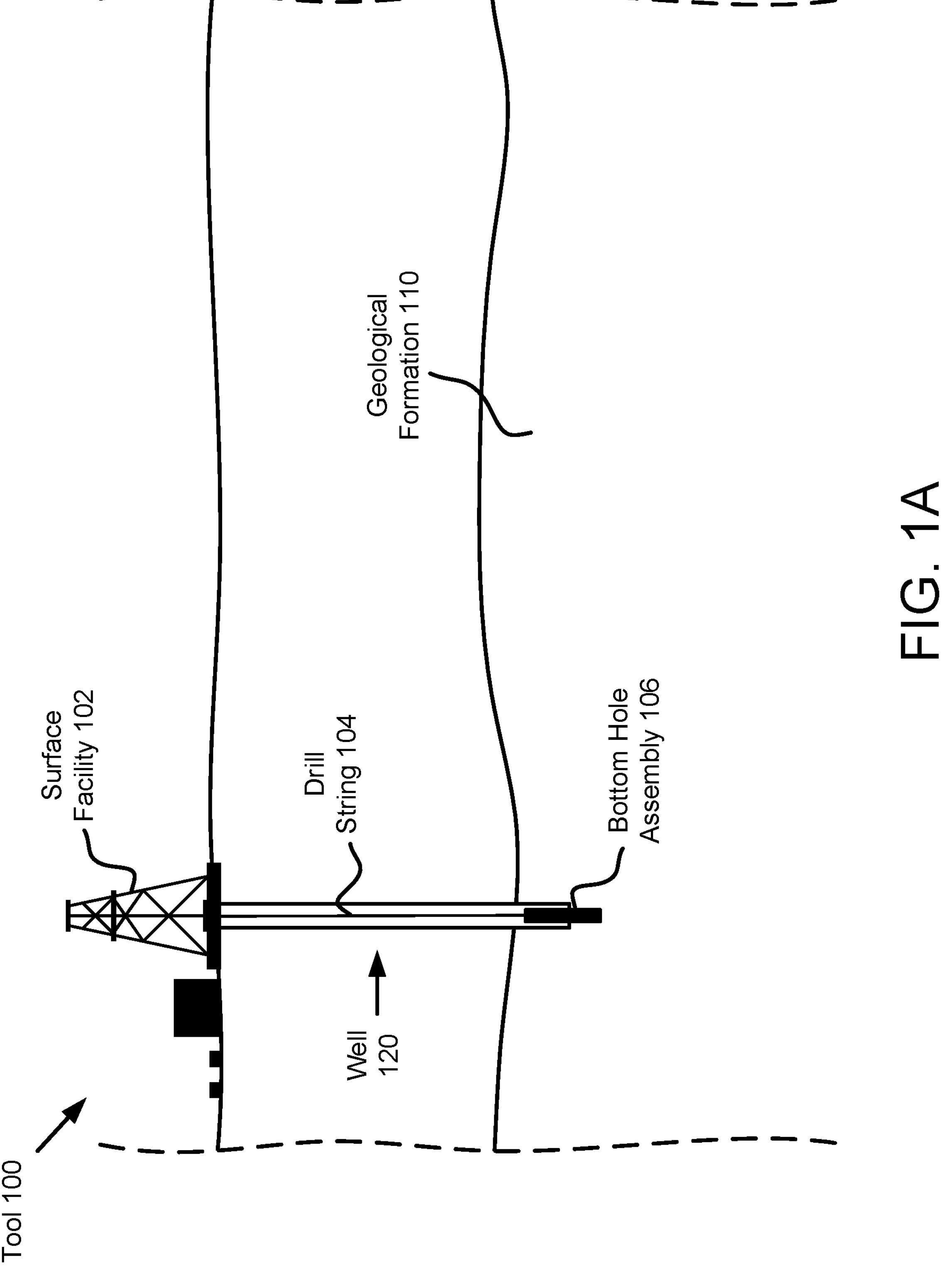
FIG. 1A shows a block diagram illustrating a first system in accordance with an embodiment.

Turning to FIG. 1A, a first block diagram illustrating a first system in accordance with an embodiment is shown. The first system may be used to exploit geological formation 110. Geological formation 110 may be a portion of the earth crust. In the example shown in FIG. 1A, geological formation 110 is illustrated as being a layer positioned on land; however, it will be appreciated that embodiments disclosed herein may be used with respect to geological formations positioned below oceans or other bodies of water.

Geological formation 110 may be usable, for example, to produce energy resources (e.g., hydrocarbons), to sequester undesired materials (e.g., greenhouse gasses), and/or for other purposes. To exploit geological formation 110, well 120 may be drilled to provide for physical access to geological formation 110. In this manner, materials may be removed from and/or added to geological formation 110 (e.g., via well 120). Although shown as a vertical well in FIG. 1A, well 120 may be a directional well, a horizontal well, and/or any other type of well (e.g., having curved wellbore sections).

To determine how to exploit geological formation 110, information regarding the properties of geological formation 110 may be collected. To do so, tool 100 may be used. Tool 100 may include any of surface facility 102, drill string 104, bottom hole assembly 106, and/or other tools (e.g., logging tools, not shown).

Surface facility 102 may be a facility positioned above geological formation 110. While drawn in FIG. 1A as being positioned on land and including a derrick, surface facility 102 may be a waterborne vessel such as a drill ship or other type of sea going vessel (e.g., a platform) without departing from embodiments disclosed herein.

Surface facility 102 may include, for example, (i) control systems for other components, (ii) materials (e.g., drilling mud, water, gasses such as carbon dioxide) usable to form and characterize well 120 and/or geological formation 110, (iii) various assemblies and/or components usable with various assemblies, (iv) drill pipe and/or other components for well development, (v) completion components such as cement for completion of well 120, (vi) power systems, (vii) storage tanks for various materials used in well construction, and/or (viii) other materials, systems, etc. for well development.

Drill string 104 may include (i) any number of sections of drill pipe, (ii) wirelines usable to send control signals and/or power to downhole components, (iii) fluid lines and/or other lines for moving of fluids between bottom hole assembly 106 and/or surface facility 102, and/or (iv) other components usable as part of a drill string. Drill string 104 may connect bottom hole assembly 106 to surface facility 102, and may divide the wellbore into an annulus (e.g., an area between the outside of the drill pipe and wellbore walls) and interior of tool 100.

Bottom hole assembly 106 may provide for, in addition to other functions, performance of various tests on well 120 and/or portions of geological formation 110 surrounding (e.g., proximate to) well 120.

To obtain information regarding the properties of well 120 and/or geological formation 110, tool 100 may include various logging tools (not shown) that may collect and/or transmit measurement data (e.g., well log data). A logging tool may be activated from surface facility 102, which may record the well log data transmitted from the tool. For example, tool 100 may include a sonic logging tool that may be lowered into well 120 on a wireline in order to acquire sonic log data for well 120. The sonic logging tool may exploit properties of acoustic wave energy (e.g., seismic wave energy), which may induce oscillations within, interact with, and/or may be otherwise influenced by properties of geological formation 110.

For example, acoustic signals from various types of transmitters (e.g., monopole, dipole) may be emitted by the sonic logging tool into geological formation 110, and the acoustic signals may be reflected from structural features of geological formation 110. The reflected acoustic signals may be detected using receivers (e.g., sensors) placed along the sonic logging tool. The acoustic signals may be recorded as acoustic waveform data. The waveforms recorded at each receiver location may be referred to as traces, and reflections from the structural features may appear has coherent energy (e.g., reflectors) across neighboring traces (e.g., receiver locations).

The sonic log data (e.g., waveform data) may provide data usable to infer structural properties of well 120 and/or geological formation 110. For example, the sonic log data may be used to identify fracture properties (e.g., dip, azimuth), and/or to assess structural connectivity of portions of geological formation 110. To do so, reflectors (e.g., signal indicating geological structure and/or other properties of geological formation 110) of the waveform data may be tracked from trace to trace in order to locate a position of the reflector (e.g., depth of a portion of the structure of geological formation 110) and a dip angle associated with the reflector at each position.

The reflector data (e.g., position and dip of the reflector at each trace) may be used to infer properties of geological formation 110 and/or well 120. For example, the reflector data, along with other data, may be used to detect fractures and/or evaluate cement bonding of casing to the wellbore. The sonic log data may be used to infer these properties with different degrees of accuracy depending on a variety factors. For example, the sonic log data usable to infer these properties may rely on a corresponding set of assumptions which may or may not be true.

For example, complex structures (e.g., anticlines, inclines), and/or curved wellbore sections may produce highly curved reflectors during sonic logging. These highly curved reflectors may be more difficult to track and may have greater trace to trace variation in local dip than flat reflectors that may be produced from sonic logging of vertical wellbores and/or simple (e.g., flat) structures of the geological formation. Thus, in order to obtain accurate information regarding the properties of geological formation 110, the well log data may require various processing, analysis and/or interpretation steps in order to adequately track the reflectors.

The processed sonic log data, along with other data regarding well 120 and/or geological formation 110, may be used to improve well operations and planning. For example, drilling and completion designs may be optimized via improved fracture evaluation, geological modeling, and/or reservoir evaluation. Thus, the interpreted sonic log data may be used to design an operation plan for well 120 that may be likely to increase hydrocarbon recovery and/or reduce the costs associated with hydrocarbon recovery. Therefore, the manner in which the sonic log data is processed (e.g., the reliability of the processed well log data, the ability to process large volumes of well log data efficiently) may impact a rate of hydrocarbon production using the well.

In general, embodiments disclosed herein relate to methods and systems for operating wells, obtaining information to aid in the modeling of wells, and/or proximate geological formations for various uses. To manage operation of the wells and to provide additional information regarding the wells (e.g., properties of the geological formation), after wellbores are drilled, various intervals along the wellbore of the well and/or corresponding proximate portions of geological formation may be characterized using well logging techniques to obtain well log data and/or other information.

The well log data and/or other information may be processed (e.g., integrated) in order to infer rock and/or structural properties of the geological formation surrounding the well that may, in some combination, indicate a likelihood of a presence of hydrocarbons, a likelihood of facilitating recovery of hydrocarbons, and/or other information relating to safe and cost-effective energy production via the well.

To increase the likelihood of operating the well in a manner that may effectively exploit subterranean resources, measurement data (e.g., waveform data) obtained via sonic logging may undergo a series of processing steps in order to accurately infer properties of the geological formation.

The processing steps may include, for example, (i) preconditioning (e.g., pre-processing) of the sonic log data to obtain an image usable for tracking reflections recorded in the sonic log data (e.g., a migrated image), (ii) performing an iterative cross-correlation based reflector tracking process using the preconditioned sonic log data to obtain reflector data (e.g., estimated positions and dip angles of the reflector across a number of traces), (iii) using the reflector data to infer properties of portions of the wellbore and/or the proximate geological formation, and/or (iv) using the properties to guide operation of the well to facilitate the exploitation of the subterranean resources.

The iterative cross-correlation based reflector tracking process may be performed in a manner that allows for reliable tracking of highly curved reflectors. The process may be automated, based on a set of initial parameters, and may track a number of reflectors in large volumes of waveform data. The automated process may reduce the need for manual intervention and/or time required to manually track the reflectors (e.g., manual picking).

By doing so, properties inferred using sonic log data may be more reliable due to improved reflector tracking across waveforms of the sonic log data, which may result in improved estimation of reflector dip and azimuth. The formation properties may be used in combination with other data to obtain a well model (e.g., a geological model), which may be used to establish an operation plan (e.g., well completion plans and/or any other type of plan for exploitation of the geological formation).

Operation plans may be obtained in an automated (e.g., computer defined), semiautomated (e.g., computer guided with subject matter expert review/feedback), and/or manual (e.g., subject matter expert defined) manner. Once obtained, wells may then be operated (e.g., completed, and the geological formation may then be exploited) according to the plans. Thus, the resulting wells and corresponding exploitation of the geological formation may be more likely to be desirable by virtue of the accuracy of the formation properties used in the formulation of the operation plans. To obtain operation plans, a modeling system in accordance with an embodiment may be used.

Figure 1B:
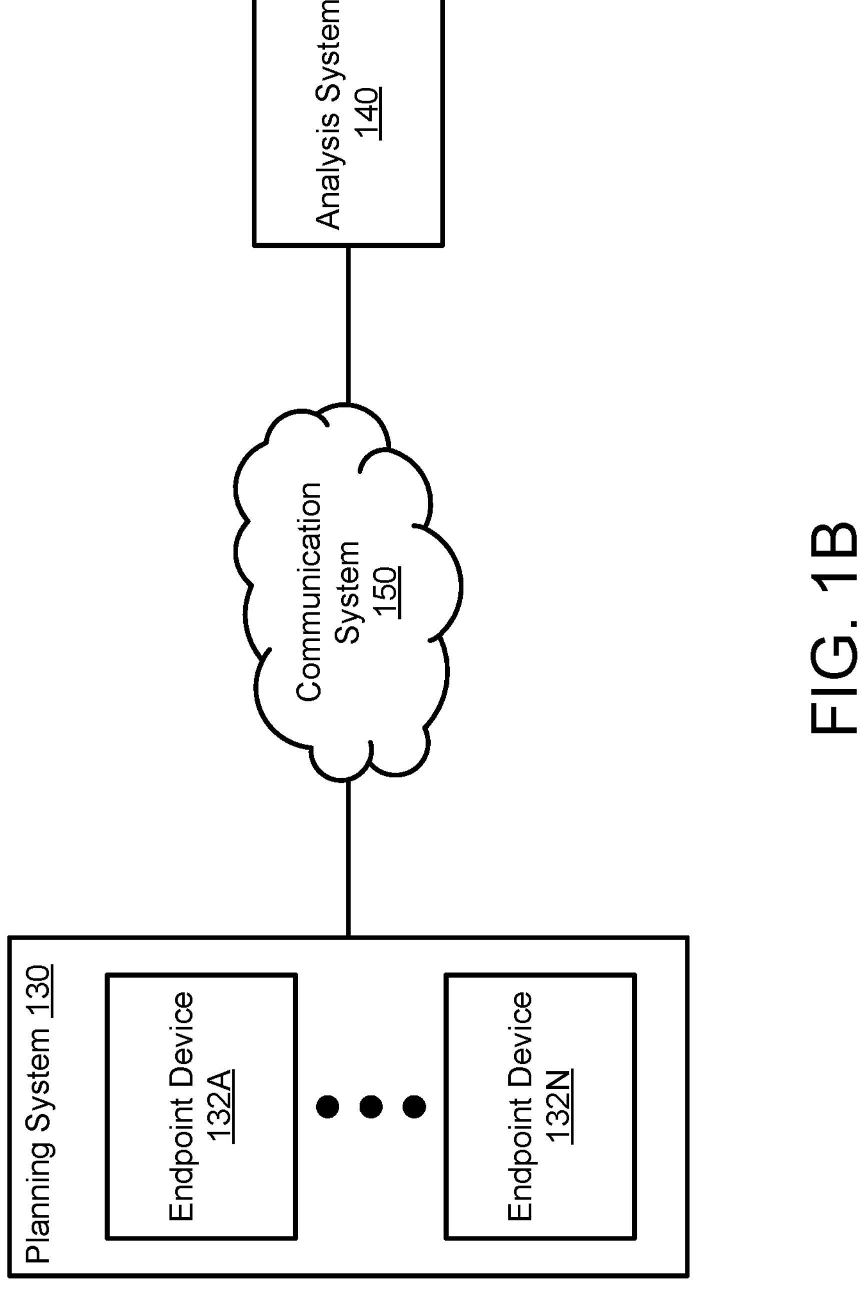
FIG. 1B shows a block diagram illustrating a second system in accordance with an embodiment.

Turning to FIG. 1B, a second block diagram illustrating a second system in accordance with an embodiment is shown. The second system may be used to establish operation plans for wells. To provide the above noted functionality, the modeling system of FIG. 1B may include planning system 130, analysis system 140, and communication system 150. Each of these components is discussed below.

Planning system 130 may facilitate operation planning for wells. To do so, planning system 130 may gather and provide information regarding a not-yet-completed well to analysis system 140. The information may have been obtained using a variety of downhole tools such as a micro-imager (e.g., measures resistivity along the wellbore), sonic tools (e.g., acoustic or other sounds-based measurements), spectroscopic tools (e.g., measurements based on nuclear properties), and/or other types of downhole tools. For example, the information may include information from processed sonic log data (e.g., reflector data) and/or other data (e.g., seismic data, other log data).

Based on the provided data, analysis system 140 may return well properties, including (i) properties of the rock forming the geological formation in which the wellbore is positioned, (ii) properties of wellbore casing and/or cement (e.g., for evaluation of cement placement and/or quality), and/or (iii) other well properties. Planning system 130 may use this information to define an operation plan, and/or manage operation of a well based on the operation plan.

For example, planning system 130 may use the well properties and/or other information to define a topology of the well. The topology may be defined in an automated manner (e.g., automatic selection of where the well will interact with the geological formation), semi-automated (e.g., suggest where the well will interact with the geological formation, allow a subject matter expert to confirm/reject/modify the suggestion), and/or manual manner (e.g., allow the subject matter expert to review and use the information to define the operation plan.

To provide its functionality, planning system 130 may include any number of endpoint devices (e.g., 132A-132N). The endpoint devices may include various types of computing devices used by personnel working on operation of the wells.

Analysis system 140 may analyze the data provided by planning system 130 to identify rock properties and/or other information (e.g., zones of interest of the geological formation and/or along the wellbore). Once obtained, the rock properties may be used to obtain various graphical user interfaces (and/or other types of interfaces) usable by automated systems and/or subject matter experts to identify more promising locations along a wellbore with respect to hydrocarbon production. The graphical user interfaces and/or underlying data may be provided to planning system 130. Refer to FIGS. 2A-2D for additional details regarding information provided by analysis system 140 to planning system 130.

When providing their functionality, any of (and/or components thereof) planning system 130 and analysis system 140 may perform all, or a portion, of the actions and methods illustrated in FIGS. 2A-4.

Any of (and/or components thereof) planning system 130 and analysis system 140 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

Any of the components illustrated in FIG. 1B may be operably connected to each other (and/or components not illustrated) with communication system 150. In an embodiment, communication system 150 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1B as including a limited number of specific components, a system in accordance with an embodiment may include fewer, additional, and/or different components than those illustrated therein.

To further clarify embodiments disclosed herein, data flow diagrams in accordance with an embodiment are shown in FIGS. 2A-2D. In these diagrams, flows of data and processing of data are illustrated using different sets of shapes. A first set of shapes (e.g., 200, 204, etc.) is used to represent data structures, and a second set of shapes (e.g., 202, 224, etc.) is used to represent processes performed using and/or that generate data. Shapes drawn in dashing (e.g., 220) may indicate that these data structures and/or processes are optional and therefore may be omitted. Additionally, as part of the flows of data, various data processing operations may be performed.

Figure 2A:
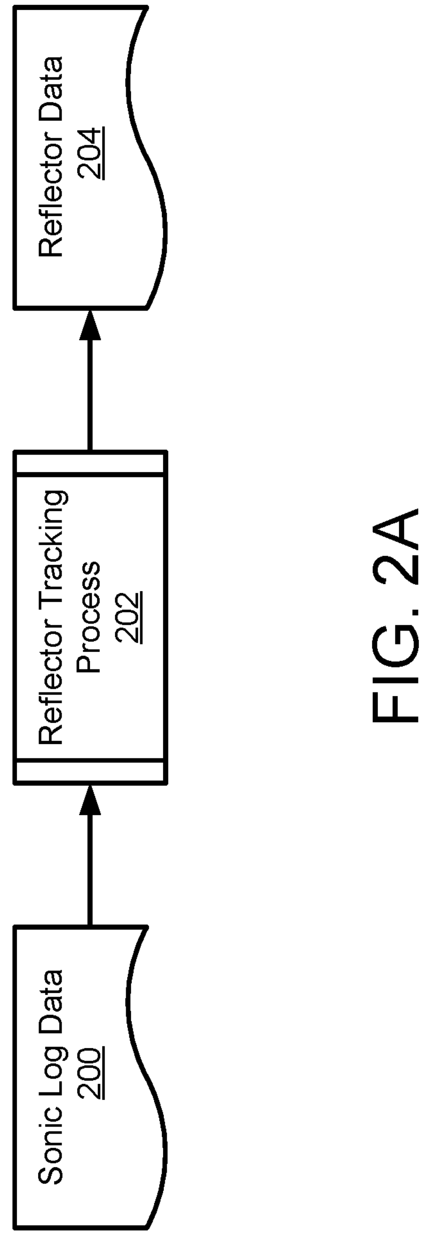
FIGS. 2A-2D show data flow diagrams in accordance with an embodiment.

Turning to FIG. 2A, a first data flow diagram in accordance with an embodiment is shown. The first data flow diagram may illustrate data used in and data processing performed in preparing sonic log data for well modeling.

To prepare the sonic log data for modeling, reflector tracking process 202 may be performed. During reflector tracking process 202, sonic log data 200 may be processed in order to (i) extract relevant information for inferring well properties, (ii) remove artifacts and/or statistical outliers, and/or (iii) otherwise place the sonic log data in a form for subsequent modeling. For example, the resulting reflector data 204 may be compatible with various analysis algorithms, well modeling processes, and/or other processes.

Sonic log data 200 may include measurements made by and/or information derived based on a sonic tool (e.g., sonic log data and/or data generated based on the sonic log data). Each measurement may be a continuous or discrete characterization of the portions of the well. For example, to obtain sonic log data 200, the measurements may be made by moving a sonic tool along the wellbore (e.g., from the near surface down through the layers of the geological formation). During the movement, acoustic signals from monopole and/or dipole sources of the sonic tool may be emitted into the geological formation in order to excite a response before being recorded at a number of receiver stations by a number of sensors at each receiver station.

Figure 2B:
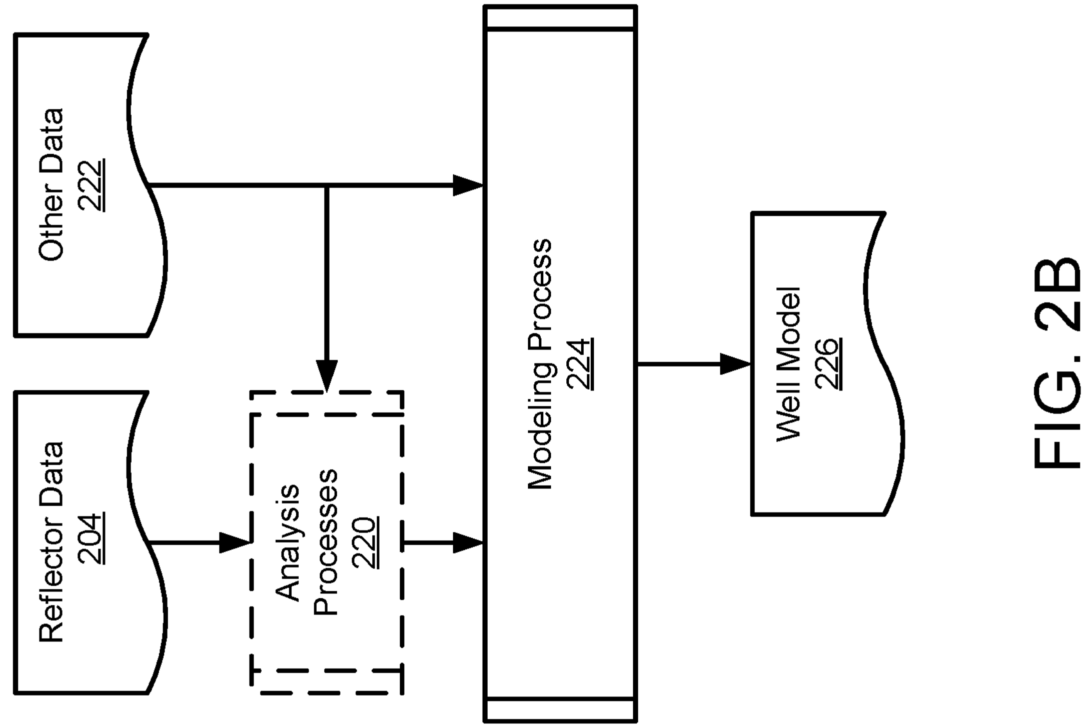
Figure 2C:
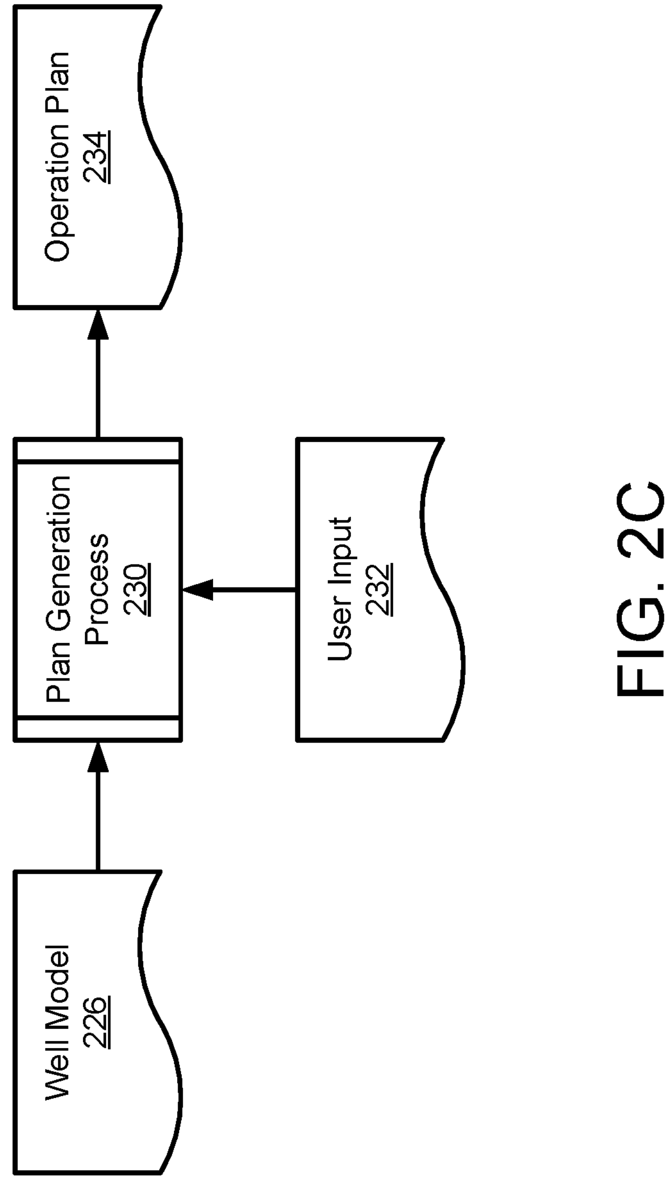
Figure 2D:
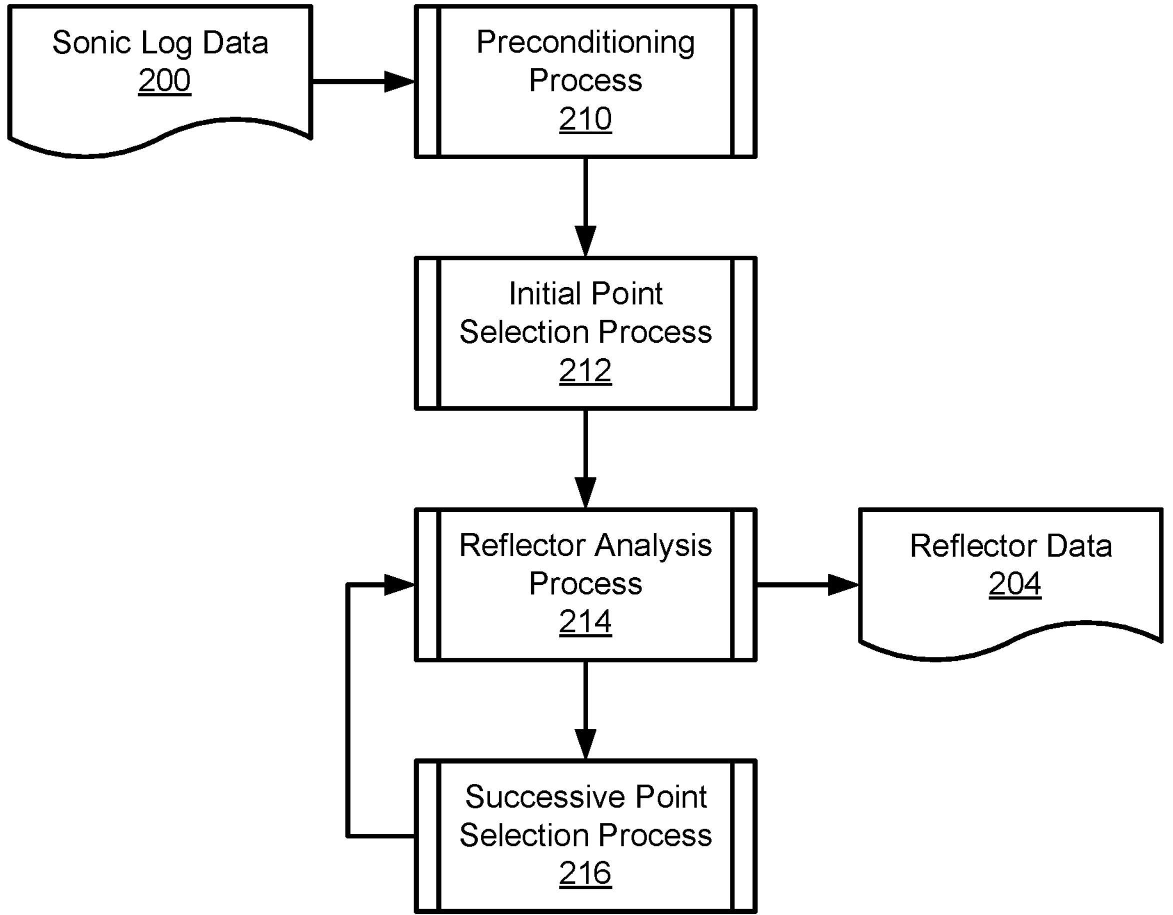

The data recorded by the sonic tool may be used to characterize the well and/or the surrounding formation. For example, features such as geological boundaries, faults, layering, and/or fractures may be identified based on waveforms (e.g., reflectors) in the sonic log data. To identify and/or track a reflector, the sonic log data may be algorithmically processed using a variety of different algorithms. The output of these algorithms may be a plurality of points on the reflector and a plurality of dip angles of the reflector for the plurality of points (e.g., reflector data 204). Refer to FIG. 2D for more information regarding reflector tracking process 202.

Once obtained, reflector data 204 may be used to guide operation of the well. For example, reflector data 204 may be used to infer well conditions and/or characteristics of the geological formation surrounding the well. Accordingly, any of the measurements of the sonic log data may characterize the well and/or geological formation along all, or a portion, the wellbore. This information may be used to decide how to operate the well, such as where to install completion components such as chokes, packers, perforations, and/or other types of components that may be used to modify a manner in which the well operates. Refer to FIGS. 2B-2C for more information regarding use of reflector data 204 in well operation.

Turning to FIG. 2B, a second data flow diagram in accordance with an embodiment is shown. The second data flow diagram may illustrate data used in and data processing performed in obtaining a well model usable to guide operation of a well.

To obtain well model 226, modeling process 224 may be performed. During modeling process 224, reflector data 204 and other data 222 may be ingested and used to generate well model 226. Reflector data 204 and other data 222 may include information regarding different types of measurements of the well and/or the geological formation.

For example, reflector data 204 may include preconditioned sonic waveform data (e.g., a migrated image of the sonic waveform data), and information derived from the sonic waveform data (e.g., position and dip information relevant to various portions of the geological formation). Other data 222 may include, for example, seismic data, well log data, core analysis data, fracture data, historical production information (e.g., for other proximate wells), and/or any other data usable for well modeling, geological modeling, etc.

Reflector data 204 and/or portions of other data 222 may be input to analysis processes 220, where additional information relevant to the well and/or the geological formation may be derived. For example, reflector data 204 may be input to a beamforming process where a signal-to-noise ratio of the reflectors is improved before estimating azimuthal information of the reflectors. Or, for example, reflector data 204 may be integrated with borehole resistivity images of other data 222 in order to obtain a structural model for the well that may be used to identify formation dip as well as near-wellbore connectivity to far-field fractures. Analysis processes 220 may include any type of process that uses and/or manipulates reflector data 204 and/or other data 222 in order to obtain information relevant to modeling process 224.

During modeling process 224, well properties (including properties of the geological formation) may be inferred based on the ingest data. For example, reflector data 204 may include high-resolution information regarding dip, azimuth, and position of various reflectors, which may be required for reservoir evaluation and/or geological modeling. Other data 222 may be used to infer a structural framework of a geological model of the formation, rock properties and/or types included in the geological formation, information usable to characterize the topology of the well, etc.

The resulting well model 226 may include a model of the well and/or a geological model of the geological formation proximate to the well. Well model 226 may include any number of well models. For example, when information regarding multiple wells (and proximate geological formations) situated in a field are input to modeling process 224, well model 226 may include a geological model of the field. Well model 226 may be used as a static model as input to a reservoir simulation process and/or to obtain a well operation plan.

Turning to FIG. 2C, a third data flow diagram in accordance with an embodiment is shown. The third data flow diagram may illustrate data used in and data processing performed in obtaining an operation plan usable to operate a well.

To obtain operation plan 234, plan generation process 230 may be performed. During plan generation process 230, well model 226 may be analyzed to identify portions of the geological formation that are composed of materials that may facilitate energy production via the well. Portions of the wellbore corresponding to the identified portions of the geological formation may also be identified and may be used to generate operation plan 234. A user may provide user input 232, which may include values for various criteria and/or other information that may influence the outcome of plan generation process 230 (e.g., operation plan 234).

Operation plan 234 may include any number of parameters for operating the well and/or actions to be performed in order to operate the well. For example, operation plan 234 may include completion plans and/or drilling plans (e.g., for well deviations).

Once obtained, operation plan 234 may be used to operate (e.g., complete) a well. For example, all or a portion of the actions specified by operation plan 234 may be performed to operate the well. The operation plan may include a well completion plan. An operator of the planning system may use the well model to complete the well completion plan. For example, a subject matter expert, another person, or an automated system may use the well model to identify portions of the well for hydrocarbon exploitation. The identified portions may be used to define workflows (e.g., actions) to complete the well such that the portions of the well are used for the eventual exploitation of hydrocarbons. For example, various portions of the well may be designated for perforating.

The well may be completed using the operation plan to obtain a completed well. The well may be completed by performing any of the actions/workflows specified by the operation plan. For example, various actions may be performed to install completion components in the well. The location and type of the completion components may be based on the well model. Once completed, the well may be used, for example to bring various types of hydrocarbons to the surface. It will be appreciated that the well may be used for other purposes without departing from embodiments disclosed herein.

As previously discussed, reflector data may be used to operate wells. FIG. 2D shows an example processing flow usable to obtain reflector data from the sonic log data. However, it will be appreciated that the processing steps of the example processing flows may be performed in different orders (e.g., sequentially or in parallel), any may be omitted, and other may be performed without departing from embodiments disclosed herein.

Turning to FIG. 2D, a fourth data flow diagram in accordance with an embodiment is shown. The fourth data flow diagram may illustrate a first example of data used in and data processing performed in order to obtain reflector data for a well (e.g., for a geological formation in which the well is positioned). FIG. 2D may show an example of reflector tracking process 202 of FIG. 2A.

To obtain the reflector data (e.g., 204), sonic log data 200 may be recorded during sonic logging of the well, and sonic log data 200 may be input to preconditioning process 210. Preconditioning process 210 may include calibration processes, filtering processes, signal enhancement processes, velocity analysis and/or preparation processes, migration processes, and/or any other processes that may improve signal-to-noise ratios of sonic log data 200 and/or that may otherwise prepare sonic log data 200 for analysis or interpretation.

Preconditioning process 210 may include obtaining a migrated image of sonic log data 200. For example, sonic log data 200 may be migrated using an adequate velocity function and a depth migration process. The resulting migrated image may include a plurality of traces, and each trace of the plurality of traces may include a number of samples (e.g., depth samples), depending on increment parameters specified for the migration process. For example, a sample interval may be specified for the migration process based on the sample rate of the sonic log data, processing objectives, and/or other factors.

The migrated image may include a two-dimensional (2D) migrated image, or a three-dimensional (3D) migrated image. The migrated image may include reflected energy (e.g., reflectors) from the geological formation proximate to the well. For example, the reflectors may be indicated by coherent energy across neighboring traces at varying depth samples of each of the neighboring traces. To track the reflector, an initial point along the reflector may be identified.

To identify the initial point along the reflector, initial point selection process 212 may be performed. During initial point selection process 212, a first trace of the migrated image may be selected (e.g., via any process). The initial point may include a spatial position (e.g., of a trace) and a depth position (e.g., a depth sample of the trace). Once selected, the first trace may undergo an amplitude analysis step. For example, the trace envelope of the first trace may be computed as a measurement of acoustic impedance/reflectivity of the first trace. If the trace envelope of the first trace exceeds an envelope threshold, then a (depth) sample of the first trace may be identified. The (depth) sample may be associated with the highest amplitude reflector on the trace and may be used to obtain the initial point.

For example, consider a 2D migrated image in the x-z plane $w(x, z)$. The envelope of $w(x, z)$ may be denoted as $E(x, z)$, with its maximum $E_{max}$. For a given trace, $x_0$, when $E(x_0, z) \geq pE_{max}$ for some envelope threshold, p, a local peak of $E(x_0, z)$ is selected so that $E(x_0, z_{peak})=E_{max}(x_0, z)$. Then, for window length L, a search may be performed to identify $\max[w(x_0, z)]$ in search window $-L/2 \leq z \leq L/2$, and $z_0$ may be identified so that $w(x_0, z_0)=\max[w(x_0, z)]$. Window length L may be defined, for example, by $$L = \frac{v}{2f}, \quad (1)$$

where v is the average migration velocity and f is the central frequency of the source signal during acquisition of sonic log data 200. In this example, a maximum peak sample (e.g., positive amplitude) or a maximum trough sample (e.g., negative amplitude) may be selected. The search may also be performed to identify max ($|w(x_0, z)|$) in order to identify a maximum peak sample of $w(x_0, z)$.

Once the initial point (e.g., $(x_0, z_0)$) has been identified, the initial point may be provided to reflector analysis process 214, where the reflector associated with the initial point may be tracked across other traces (e.g., neighboring traces) of the migrated image. To do so, a reflector tracking process may be performed.

Reflector analysis process 214 may include an iterative cross-correlation based reflector tracking process. During reflector analysis process 214, measures of similarity of neighboring traces to the first trace (that includes the initial point, $(x_0, z_0)$) may be obtained in order to track the reflector. To do so, a portion of (e.g., samples of) the first trace may be cross-correlated with a portion of (e.g., samples of) at least one proximate (e.g., neighboring) trace to obtain a set of cross-correlation coefficients, $\{cc_i\}$. Each cross-correlation coefficient of $\{cc_i\}$ may indicate a degree of correlation (e.g., a measure of similarity) between the portion of the first trace and the portion of the neighboring trace associated with the cross-correlation coefficient.

For example, for the initial point $(x_0, z_0)$, the cross-correlation coefficient may be given by $$cc_i = \frac{\int_{-\frac{L}{2}}^{\frac{L}{2}} w(x_0, z_0+\zeta)\, w(x_i, z_i+\zeta)\, d\zeta}{\left[\int_{-\frac{L}{2}}^{\frac{L}{2}} w^2(x_0, z_0+\zeta)\, d\zeta \int_{-\frac{L}{2}}^{\frac{L}{2}} w^2(x_i, z_i+\zeta)\, d\zeta\right]^{\frac{1}{2}}}, \tag{2}$$

where $i\neq 0$ is a horizontal index, $n>0$ is half of a horizontal window length of cross-correlation, and $-n\leq i\leq n$ (e.g., $n=3$ so that the portion of the initial trace is cross-correlated with 3 left-adjacent traces and 3 right-adjacent traces); $\zeta$ is a sample increment for each trace; and $(x_i, z_i)$ is a point of a neighboring trace given by $$x_i = x_0 + i\Delta x, \tag{3}$$

$$z_i = z_0 + i\Delta \tan(\theta_0 + j\Delta\theta), \tag{4}$$

where $\theta_0$ is an offset angle ($\theta_0=0$ unless a priori information indicates otherwise); $\Delta\theta$ is a sample increment (e.g., angle increment, such as 1.5 degrees); and j is a sample index for $-m\leq j\leq m$, $m>0$ is half of a sample search window (e.g., dip angle search window), where m may be given by $$m = \frac{\theta_{max}}{\Delta\theta} + 1, \tag{5}$$

where $\theta_{max}$ is a maximum expected dip angle (e.g., for any point on the reflector).

Then, for example, to estimate a dip angle for the initial point $(x_0, z_0)$, a minimum value of the set of cross-correlation coefficients may be identified so that $$C_j = \min_{-n\leq i\leq n}(\{cc_i\}) = \min(cc_{-n}, \ldots, cc_{-1}, cc_1, \ldots, cc_n), \tag{6}$$

and the maximum value of $C_j$ is given by $$C_{max} = \max_{-m\leq j\leq m}(C_j). \tag{7}$$

Thus, cross-correlation coefficient $C_{max}$ may indicate a highest degree of correlation between the portion of the first trace and a portion of the second trace (e.g., between a sample of the initial point and a sample of a second point of a second trace, associated with indices i and j of $C_{max}$). In other words, the portion of the first trace and the portion of the second trace may have highest levels of similarity (when compared to any other portions of traces of a group of neighboring traces defined by n). This may indicate that the second point is likely to be on the reflector. Thus, during reflector analysis process 214, the second point may be used to identify (e.g., estimate) the dip angle for the initial point. The dip angle may be estimated using an estimation method that varies based on the cross-correlation coefficient and a threshold.

In a first example, where $C_{max}\geq C_{thresh}$, for some correlation threshold $C_{thresh}>0$ (e.g., $C_{thresh}=0.7$), the cross-correlation between the initial point and the second point may be considered a good quality cross-correlation (e.g., indicating that the reflector is likely to be reliably tracked at the second point). To estimate the dip angle, index $j_{max}$ may be identified so that $C_{jmax}=C_{max}$, and the dip angle of the initial point $(x_0, z_0)$ may be given by $$\theta(x_0, z_0) = \theta_0 + j_{max}\Delta\theta, \tag{8}$$

and $\theta(x_0, z_0)$ may be obtained using a mathematical technique such as quadratic interpolation (e.g., using indices of $C_{jmax-1}$, $C_{jmax}$, and $C_{jmax+1}$). Once obtained, the initial point $(x_0, z_0)$ and its corresponding estimated dip angle $\theta(x_0, z_0)$ may be stored as a portion of reflector data 204.

The initial point may be used to estimate successive points (e.g., other points on the reflector). To do so, successive point selection process 216 may be performed. During successive point selection process 216, points on the reflector on left-adjacent and right-adjacent traces to the initial trace may be estimated using the initial point and the dip angle. For example, left-adjacent point $(x_L, z_L)$ and/or right-adjacent point $(x_R, z_R)$ on the reflector may be estimated using equations (9)-(12).

$$x_L = x_0 - \Delta x, \tag{9}$$

$$z_L = z_0 - \Delta x \tan\theta(x_0, z_0), \tag{10}$$

and $$x_R = x_0 + \Delta x, \tag{11}$$

$$z_R = z_0 + \Delta x \tan\theta(x_0, z_0). \tag{12}$$

Once a successive point is estimated, a second dip angle for the successive point may be estimated during reflector analysis process 214. To do so, the successive point may be provided to reflector analysis process 214.

During reflector analysis process 214, the successive point (e.g., $(x_R, z_R)$) may be used in place of the initial point $(x_0, z_0)$, with $\theta_0=\theta(x_0, z_0)$ so that m (e.g., defining a dip angle search window, see equation (5)) may be reduced (to improve process efficiency), and the process may be repeated (e.g., via equations (2)-(8)). Successive points along the reflector and their corresponding dip angles may be stored as portions of reflector data 204.

In a second example, where $C_{max}<C_{thresh}$, the cross-correlation between the initial point and the second point may be considered a bad quality cross-correlation (e.g., indicating that the reflector is not likely to be reliably tracked at the second point). To estimate successive dip angles $\theta(x_i, z_i)$ and successive points $(x_i, z_i)$, an extrapolation function may be used. For example, any number of successive points and corresponding dip angles may be estimated using equations (13)-(15). The estimated point and corresponding dip information for the reflector may be stored as a portion of reflector data 204.

$$x_i = x_0 \pm i\Delta x, \tag{13}$$

$$z_i = z_0 \pm i\Delta x \tan\theta(x_0, z_0), \tag{14}$$

$$\theta(x_i, z_i) = \theta(x_0, z_0). \tag{15}$$

Figure 3:
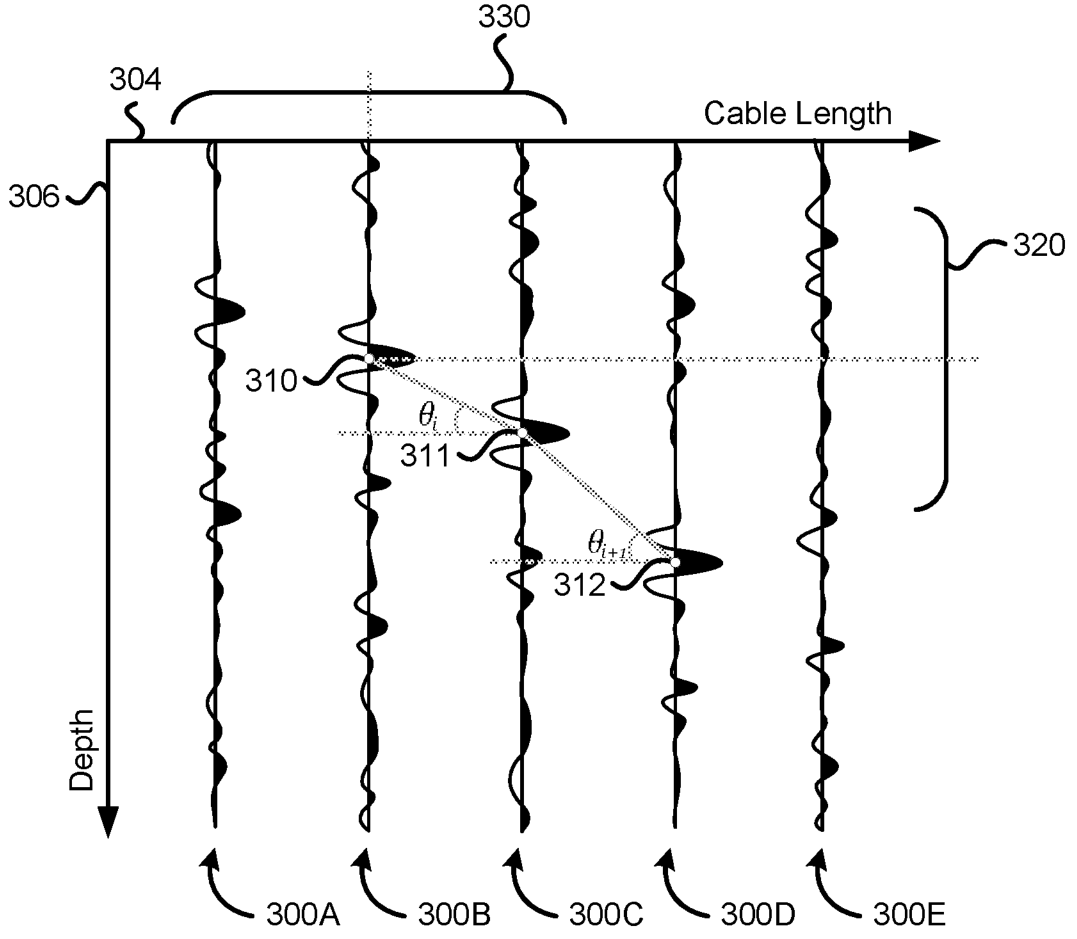
FIG. 3 shows a plot of data in accordance with an embodiment.

An example data plot of estimated points and dip angles of a reflector is shown in FIG. 3.

Turning to FIG. 3, a plot of data is shown in accordance with an embodiment. The data plot may include an example of a reflector in a portion of migrated image of sonic log data (e.g., 200) as it may be analyzed during reflector tracking process 202. It will be appreciated that the data used in the creation of these data plots is merely illustrative and that in practice, the data may be different than as illustrated in these data plots.

In the data plot of FIG. 3, example waveforms of a reflector recorded in the sonic log data are shown on traces 300A-300E. A horizontal axis may indicate a first spatial dimension of the migrated image (e.g., x of w (x, z), with increment Δx). For example, the first spatial dimension may be a wireline cable length, increasing in the direction of arrow 304. A vertical axis may indicate depth dimension of the migrated image (e.g., z of w (x, z), with increment Δz or 40). For example, the depth dimension may be a distance from the wellbore, increasing in the direction of arrow 306. The plot shown illustrates a geometric relationship between portions of reflector data (e.g., reflector position and reflector dip) for a tracked reflector.

For example, point 310 may include a first point $(x_i, z_i)$ of trace 300B, obtained via any point selection process (e.g., 212, 216). Samples of trace 300B (e.g., including $z_i$) may be cross-correlated with samples of neighboring traces as defined by a half horizontal window length of cross-correlation, n. In the example shown, horizontal window length of cross correlation 330 is defined using n=1, so that samples of trace 300A and samples of trace 300C may be cross correlated with the samples of the trace 300B (e.g., $z_i$). In practice, n may be larger (e.g., $n\in\{3, \ldots, 15\}$).

To determine which samples of neighboring traces are included in the cross-correlation, dip angle search window 320 may be defined by a half of a sample search window, m. As discussed with respect to FIG. 2D, m may be defined using equation (5), or using a priori information, and may be reduced as new dip angle information is obtained from successive point estimation. The cross correlation of samples of trace 300B with samples of traces 300A and 300B may result in obtaining a set of cross-correlation coefficients.

Of the set of cross-correlation coefficients, a cross-correlation coefficient indicating a highest degree of correlation between $(x_i, z_i)$ and samples of the neighboring traces may be identified (e.g., $C_{max}$). In the example shown, $C_{max}$ is associated with point 311 (e.g., $(x_{i+1}, z_{i+1})$) of trace 300C and may be considered a good quality cross-correlation when compared to a correlation threshold. Therefore, using point 311 (e.g., an index of $z_{i+1}$), a dip angle $\theta_i$ for point 310 may be estimated using an iterative cross-correlation based reflector tracking process (e.g., using equation (8)). A dip angle $\theta_{i+1}$ for point 311 may be estimated in a similar fashion.

Point 310 and point 311 ($(x_i, z_i)$ and $(x_{i+1}, z_{i+1})$) as well as their respective dip angles ($\theta_i$ and $\theta_{i+1}$) may be stored as a portion of a reflector data package (e.g., reflector data 204). Point 312 may be treated as a successive point on the reflector with good quality cross-correlation with point 311 of trace 300C, and therefore a dip angle corresponding to point 312 may be estimated using the iterative cross-correlation based reflector tracking process during reflector analysis process 214 of FIG. 2D.

However, note that the reflector may be difficult to track on trace 300E. Thus, cross-correlation coefficients associated with samples of trace 300E and samples of a neighboring trace (e.g., of point 312 of trace 300D) may indicate bad quality cross-correlation when compared to the correlation threshold. In this case, a dip angle for point 312 (and a point associated with trace 300E) may be estimated using extrapolation (e.g., equations (13)-(15)), and may be stored as a portion of the reflector data package (e.g., reflector data 204).

Returning to FIG. 2D, reflector data 204 may include any number of points on the reflector and/or dip angles of the reflector (e.g., for any number of reflectors). Reflector data 204 may be used by other processes (e.g., a beamforming process, modeling process) as discussed with respect to FIG. 2B.

Thus, the reflector may be tracked by iteratively estimating positions (e.g., points) on the reflector and corresponding dip angles of the reflector across any number of traces of the migrated image of sonic log data 200 (e.g., via reflector analysis process 214 and/or point selection processes (212, 216)).

It should be noted that while the method described herein is described as a 2D method, a 3D method may be performed (e.g., using a 3D migrated image). For example, the 2D method may be performed in a first spatial direction (e.g., for w(x, z)) and then in a second spatial direction (e.g., w(y, z)), or the 2D method may be extended to a 3D (e.g., w(x, y, z)).

Any of the data flows shown in FIGS. 2A-2D may be performed. Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the data structures illustrated using the first set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, using the data flows shown in FIGS. 2A-2D, acoustic signal reflections recorded during sonic logging may be analyzed using an iterative cross-correlation based reflector tracking process that may improve the quality and/or reliability of reflector data estimated by tracking the reflectors. Doing so may improve the reliability and effectiveness of well operation plans generated using the reflector data.

Figure 4:
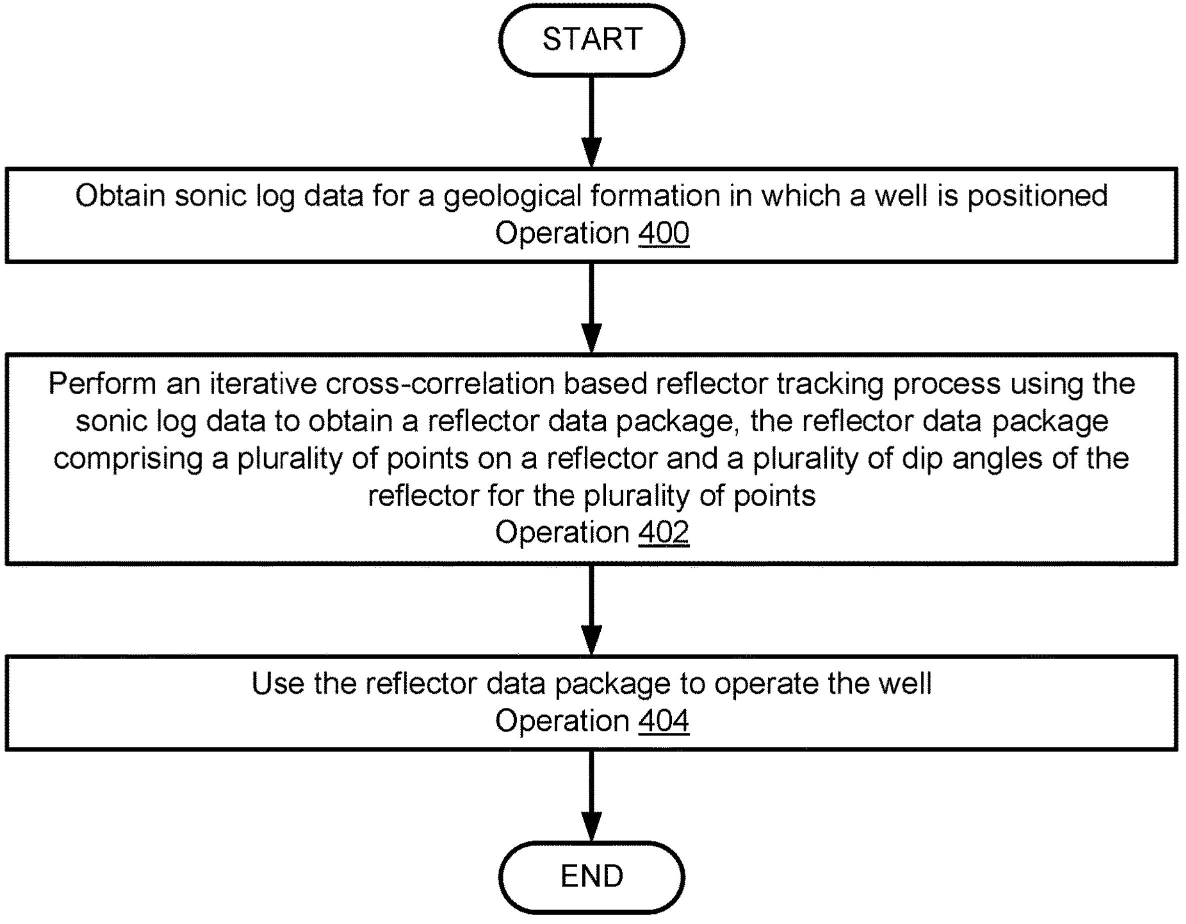
FIG. 4 shows a flow diagram illustrating a method in accordance with an embodiment.

As discussed above, the system of FIGS. 1A-1B may facilitate the performance of various methods. FIG. 4 shows a diagram illustrating a method that may be performed by the system.

Turning to FIG. 4, a flow diagram illustrating a method in accordance with an embodiment is shown. The flow diagram may illustrate various operations performed while managing operation of a well.

At operation 400, sonic log data for a geological formation in which a well is positioned may be obtained. The sonic log data may be obtained by (i) reading the sonic log data from storage, (ii) receiving the sonic log data from another device, (iii) generating the sonic log data, and/or (iv) via other methods. For example, the sonic log data may be generated by running a sonic log tool in the wellbore at various depth intervals. The sonic log data may be input to a reflector tracking process.

Prior to performing the reflector tracking process, a migrated image of the sonic log data may be obtained. The migrated image may be obtained by (i) reading the migrated image from storage, (ii) receiving the migrated image from another device, (iii) generating the migrated image, and/or (iv) via other methods.

For example, generating the migrated image may include obtaining a velocity model suitable for performing a migration process for the sonic log data, and performing a migration process using a migration algorithm, the velocity model, and the sonic log data. The migration algorithm may include a depth migration algorithm, and the migrated image may be a depth domain migrated image. The migrated image may include a plurality of traces, and the number of traces and/or interval between the traces may be defined by parameters of the migration algorithm.

At operation 402, an iterative cross-correlation based reflector tracking process may be performed using the sonic log data to obtain a reflector data package. The iterative cross-correlation based reflector tracking process may be performed using methods described with respect to FIG. 2D and/or by other methods.

The reflector data package my include a plurality of points on a reflector and a plurality of dip angles of the reflector for the plurality of points. The iterative cross-correlation based reflector tracking process may use an initial point of the plurality of points. The initial point may be a data point on a first trace of the plurality of traces of the migrated image. The initial point may be identified based on an envelope of the first trace.

Performing the iterative cross-correlation based reflector tracking process may include (i) performing a cross-correlation between the first trace and at least one proximate trace of the plurality of traces (e.g., at least one neighboring trace) to obtain a set of cross-correlation coefficients, and (ii) obtaining a dip angle of the plurality of dip angles for the initial point using the cross-correlation coefficients. For example, performing the cross-correlation may include comparing samples of the first trace and samples of the at least one proximate trace in accordance with a cross-correlation function.

Obtaining the dip angle may include (i) identifying a cross-correlation coefficient of the cross-correlation coefficients (e.g., of neighboring traces) that indicates a highest degree of correlation (e.g., with the first trace), and (ii) using a second point associated with the identified cross-correlation coefficient to identify the dip angle for the initial point.

Identifying the cross-correlation coefficient that indicates a highest degree of correlation may include (i) rank ordering the cross-correlation coefficients in descending order of coefficient value, and (ii) selecting the first rank ordered cross-correlation coefficient (e.g., the cross-correlation coefficient with the largest value). The selected cross-correlation coefficient may correspond to a neighboring trace of the initial trace (e.g., a second trace).

Using a second point associated with the identified cross-correlation coefficient to identify the dip angle may include (i) identifying a second cross-correlation coefficient associated with a sample of the second trace that indicates a highest degree of correlation with the initial point (the identified cross-correlation coefficient may associated with the second point), and (ii) using a function of the initial point and the second point to compute the dip angle.

Performing the iterative cross-correlation based reflector tracking process may also include estimating a successive point on the reflector based on the initial point and the dip angle. The successive point may be estimated by evaluating a function (e.g., a linear extrapolation function) of the initial point and the dip angle. Once the successive point is estimated, a second dip angle of the plurality of dip angles for the successive point may be estimated using an estimation method that varies based on the cross-correlation coefficient and a threshold.

For example, if the cross-correlation coefficient for the successive point exceeds the threshold, then the successive point may be considered good quality and a first method for dip estimation may be used (e.g., that may rely on good data quality). Otherwise, if the cross-correlation coefficient for the successive point does not exceed the threshold, then the successive point may be considered bad quality and a second method for dip estimation may be used (e.g., that does not rely on good quality data). For example, the first method may use cross-correlation and the second method may use extrapolation.

At operation 404, the reflector data package may be used to operate the well. In a first example, the reflector data package may be used by (i) obtaining a well model for the well based, in part, on the reflector data package, and (ii) selecting operating parameters for the well based, in part, on the well model, wherein the well is operated using the operating parameters.

The well model may be obtained by (i) reading the well model from storage, (ii) receiving the well model from another device, (iii) generating the well model, and/or (iv) via other methods. The well model may be generated, for example, by performing a modeling process using properties deduced from the reflector data package and/or other data. For example, the reflector signal may have dependence on the structure of the well, materials in the well, properties of the geological formation, and/or other aspects of the well. This dependence may be used to deduce these properties based on the reflector data package. Refer to the discussion of FIG. 2B for more information regarding well modeling.

The operating parameters for the well may be selected by (i) obtaining an operation plan for the well, and (ii) identifying relevant operating parameters for a current phase of the well. The operation plan may be obtained by (i) reading the operation plan from storage, (ii) receiving the operation plan from another device, (iii) generating the operation plan, and/or (iv) via other methods. For example, the operation plan and/or parameters thereof may be generated by providing the well model to a planning system. Refer to the discussion of FIG. 2C for more information regarding plan generation processes and operation plans.

In a second example, the reflector data package may be used by (i) obtaining a geological model for the geological formation based, in part, on the reflector data package, and (ii) obtaining an energy product based, in part, on the geological model. The geological model may be obtained by (i) reading the geological model from storage, (ii) receiving the geological model from another device, (iii) generating the geological model, and/or (iv) via other methods. For example, the geological model may be included in a well model obtained by methods described with respect to FIG. 2B and/or by other methods.

The energy product may be obtained using hydrocarbons produced from the operated (e.g., completed) well. The energy product may be obtained by pumping fluid into and/or extracting fluid from the geological formation using the well.

The method may end following operation 404.

Thus, as illustrated above, embodiments disclosed herein may provide systems and methods usable to manage operation of a well by improving the quality and/or reliability of reflector data that may influence the determination of well operation plans.

Figure 5:
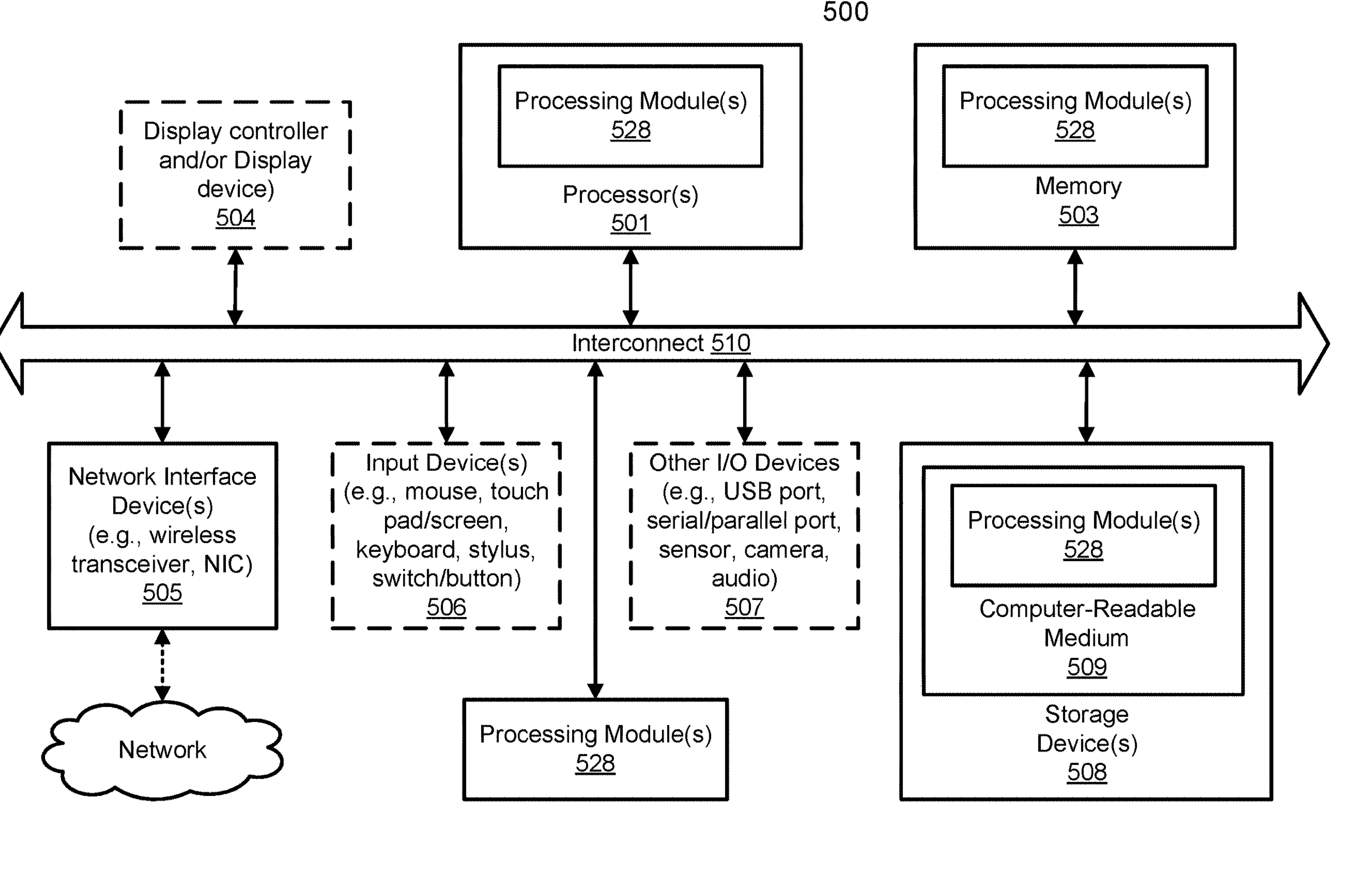
FIG. 5 shows a block diagram illustrating a data processing system in accordance with an embodiment.

Any of the components illustrated in FIGS. 1A-4 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high-level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In an embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in an embodiment can be implemented via multiple memory devices to provide for a given amount of system memory. Memory 503 may include one or more volatile storage (or memory) devices such as random-access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In an embodiment, to enable a thinner and lighter system design as well as to improve system responsiveness, this mass storage may be implemented via a solid-state device (SSD). In an embodiment, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a well, the method comprising:

disposing a logging tool in the well;

obtaining sonic log data, via the logging tool, for a geological formation in which the well is positioned;

prior to performing an iterative cross-correlation based reflector tracking process, obtaining a migrated image of the sonic log data, the migrated image comprising a plurality of traces;

performing the iterative cross-correlation based reflector tracking process using the sonic log data to obtain a reflector data package, the reflector data package comprising a plurality of points on a reflector and a plurality of dip angles of the reflector for the plurality of points, wherein the iterative cross-correlation based reflector tracking process comprises:

using an initial point of the plurality of points, the initial point associated with a first trace of the plurality of traces, and the initial point being identified based on an envelope of the first trace;

performing a cross-correlation between the first trace and at least one proximate trace of the plurality of traces to obtain a set of cross-correlation coefficients; and obtaining a dip angle of the plurality of dip angles for the initial point using the set of cross-correlation coefficients;

determining where to install completion components within the well based on the reflector data package, the completion components comprising a perforator; and perforating the well via the perforator based on the determining where to install the completion components.

2. The method of claim 1, wherein obtaining the dip angle comprises:

identifying a cross-correlation coefficient of the set of cross-correlation coefficients that indicates a highest degree of correlation; and using a second point associated with the cross-correlation coefficient that indicates the highest degree of correlation to identify the dip angle for the initial point.

3. The method of claim 2, wherein performing the iterative cross-correlation based reflector tracking process further comprises:

estimating a successive point on the reflector based on the initial point and the dip angle.

4. The method of claim 3, wherein a second dip angle of the plurality of dip angles for the successive point is estimated using an estimation method that varies based on the cross-correlation coefficient and a threshold.

5. The method of claim 1, further comprising:

obtaining a well model for the well based, in part, on the reflector data package; and selecting operating parameters for the well based, in part, on the well model, wherein the well is operated using the operating parameters.

6. The method of claim 1, further comprising:

obtaining a geological model for the geological formation based, in part, on the reflector data package; and obtaining an energy product based, in part, on the geological model.

7. The method of claim 1, further comprising bonding a casing to a wellbore of the well via a cement based on the determining where to install the completion components.

8. A non-transitory machine-readable medium having instructions stored therein, which when executed by a processor, cause the processor to perform operations for managing operation of a well, the operations comprising:

disposing a logging tool in the well;

obtaining sonic log data, via the logging tool, for a geological formation in which the well is positioned;

prior to performing an iterative cross-correlation based reflector tracking process, obtaining a migrated image of the sonic log data, the migrated image comprising a plurality of traces;

performing the iterative cross-correlation based reflector tracking process using the sonic log data to obtain a reflector data package, the reflector data package comprising a plurality of points on a reflector and a plurality of dip angles of the reflector for the plurality of points, wherein the iterative cross-correlation based reflector tracking process comprises:

using an initial point of the plurality of points, the initial point associated with a first trace of the plurality of traces, and the initial point being identified based on an envelope of the first trace;

performing a cross-correlation between the first trace and at least one proximate trace of the plurality of traces to obtain a set of cross-correlation coefficients; and obtaining a dip angle of the plurality of dip angles for the initial point using the set of cross-correlation coefficients;

determining where to install completion components within the well based on the reflector data package, the completion components comprising a perforator; and perforating the well via the perforator.

9. The non-transitory machine-readable medium of claim 8, wherein obtaining the dip angle comprises:

identifying a cross-correlation coefficient of the set of cross-correlation coefficients that indicates a highest degree of correlation; and using a second point associated with the cross-correlation coefficient that indicates the highest degree of correlation to identify the dip angle for the initial point.

10. The non-transitory machine-readable medium of claim 9, wherein performing the iterative cross-correlation based reflector tracking process further comprises:

estimating a successive point on the reflector based on the initial point and the dip angle.

11. A data processing system, comprising:

a processor; and a memory coupled to the processor to store instructions, which when executed by the processor, cause the processor to perform operations for managing operation of a well, the operations comprising:

disposing a logging tool in the well;

obtaining sonic log data, via the logging tool, for a geological formation in which the well is positioned;

prior to performing an iterative cross-correlation based reflector tracking process, obtaining a migrated image of the sonic log data, the migrated image comprising a plurality of traces;

performing the iterative cross-correlation based reflector tracking process using the sonic log data to obtain a reflector data package, the reflector data package comprising a plurality of points on a reflector and a plurality of dip angles of the reflector for the plurality of points, wherein the iterative cross-correlation based reflector tracking process comprises:

using an initial point of the plurality of points, the initial point associated with a first trace of the plurality of traces, and the initial point being identified based on an envelope of the first trace;

performing a cross-correlation between the first trace and at least one proximate trace of the plurality of traces to obtain a set of cross-correlation coefficients; and obtaining a dip angle of the plurality of dip angles for the initial point using the set of cross-correlation coefficients;

determining where to install completion components within the well based on the reflector data package, the completion components comprising a perforator;

perforating the well via the perforator based on the determining where to install the completion components; and bonding a casing to a wellbore of the well via a cement based on the determining where to install the completion components.

12. The data processing system of claim 11, wherein obtaining the dip angle comprises:

identifying a cross-correlation coefficient of the set of cross-correlation coefficients that indicates a highest degree of correlation; and using a second point associated with the cross-correlation coefficient that indicates the highest degree of correlation to identify the dip angle for the initial point.

* * * * *